(12) United States Patent
Egolf et al.

(10) Patent No.: US 6,895,529 B2
(45) Date of Patent: May 17, 2005

(54) REBUILDING "IN-DOUBT" STATES RELIABLY AFTER MULTIPLE SYSTEM FAILURES IN A DATA PROCESSING SYSTEM PERFORMING TWO-PHASE TRANSACTION PROCESSING

(75) Inventors: David A. Egolf, Glendale, AZ (US); Eric W. Hardesty, Glendale, AZ (US)

(73) Assignee: Bull HN Information Systems, Inc., Billerica, MA (US)

( * ) Notice: Subject to any disclaimer, the term of this patent is extended or adjusted under 35 U.S.C. 154(b) by 510 days.

(21) Appl. No.: 10/075,309

(22) Filed: Feb. 13, 2002

(65) Prior Publication Data
US 2003/0154423 A1 Aug. 14, 2003

(51) Int. Cl.[7] .............................. G06F 11/00
(52) U.S. Cl. ........................ 714/15; 714/21
(58) Field of Search .............. 714/15, 19, 16, 714/20, 21, 2; 707/202, 201

(56) References Cited

U.S. PATENT DOCUMENTS

| | | | |
|---|---|---|---|
| 5,734,817 A | * | 3/1998 | Roffe et al. .................. 714/15 |
| 6,182,241 B1 | * | 1/2001 | Ngai et al. ................... 714/16 |
| 6,510,421 B1 | * | 1/2003 | Ganesh et al. ................ 707/1 |
| 6,584,582 B1 | * | 6/2003 | O'Connor .................... 714/21 |
| 6,732,124 B1 | * | 5/2004 | Koseki et al. .............. 707/202 |
| 6,748,550 B2 | * | 6/2004 | McBrearty et al. ............ 714/4 |

* cited by examiner

Primary Examiner—Robert Beausoliel
Assistant Examiner—Marc Duncan
(74) Attorney, Agent, or Firm—James H. Phillips

(57) ABSTRACT

A data processing system participating in two-phase transaction processing operations which, when a system failure occurs while one or more transactions are in process, can successfully rebuild "in-doubt" states even when another system failure occurs during an attempt to effect the rebuild. The system includes a file management system having exclusive access to reserved locations in the memory for reading and writing meta-data therein and physical file access logic selectively coupling the memory and the database access application, the physical file access logic incorporating file protections which are controlled by the file management system; such that, in the event of a failure, the local state of the transaction can be faithfully rebuilt after restart by accessing the meta-data. Upon restart after a failure, the results of incomplete non-"in-doubt" transactions are removed, the files which have been updated by "in-doubt" transactions are locked and normal access to the affected database is then permitted.

2 Claims, 4 Drawing Sheets

REBUILDING "IN-DOUBT" STATES RELIABLY AFTER MULTIPLE SYSTEM FAILURES IN A DATA PROCESSING SYSTEM PERFORMING TWO-PHASE TRANSACTION PROCESSING

FIELD OF THE INVENTION

This invention relates to data processing systems, more particularly to data processing systems performing two-phase transaction processing operations, specifically to rebuilding "in-doubt" states when a system failure occurs while one or more transactions are in process and, yet more specifically, to a data processing system which can successfully rebuild "in-doubt" states even when another system failure occurs during an attempt to effect the rebuild. In another aspect, this invention relates to such a data processing system in which normal access is available to databases having files involved in unresolved transactions.

BACKGROUND OF THE INVENTION

Computer applications perform operations on data which reflect the effect of business events. For instance, computers are used to keep track of purchases, bank transactions and inventory depletion. Applications which handle business and financial data must provide deterministic results to users who depend on the data presented on terminal screens and in batch reports and for the data stored in persistent databases used to record business events.

Applications typically perform update operations to multiple database entities during the course of a single business transaction. For instance, one business transaction may transfer funds between multiple accounts. In order for the user to experience deterministic and correct behavior, the updates to all affected accounts must be executed atomically; i.e., either all updates occur or none occur. Atomicity is one important aspect of what is referred to as 'transactional' behavior. The application will run a local transaction on the host platform in order to perform the multiple updates. The entire transaction either succeeds, resulting in a "commit", or fails, resulting in a "rollback" to the status before the transaction was invoked.

When these multiple database entities reside on different computing platforms, then the application must execute a transaction on each platform. All of these transactions must cooperate in order to provide the illusion of a "global transaction" which exhibits global atomicity; i.e., either all of the transactions succeed or none of them succeed. This illusion is provided by the use of two-phase commitment protocols.

Two-phase commit protocols require that a single participant in a commitment hierarchy of cooperating transactions serve as the commitment coordinator. This commitment coordinator examines the votes from all the other participants and makes a final decision to either commit or abort the global transaction. All the other participants must abide by the decision of the coordinator in order to be consistent with the rest of the group. This level of cooperation enables transactions which can safely perform operations such as transferring funds between machines.

During the execution of the protocol, all non-coordinator participants provide their vote. If a given local vote is to abort, then the local system can immediately proceed to rollback its part of the global transaction since any vote to abort will prevent the coordinator from making a "commit" decision. However, any participant who votes to "commit" must enter an "in-doubt" state. That participant cannot know the final decision until it is distributed by the coordinator, and it has "agreed" to abide by the final decision. But, while a participant is in the "in-doubt" state, they may experience a local failure; i.e., a crash.

In the event of failure, transaction processing protocols in some highly fault tolerant operating systems allow the transactions on the failing machine, as well as its correspondents, to resort to 'heuristic decisions'. This means that the recovery phase can be abandoned, and a predetermined decision can be employed to decide whether to commit or rollback those transactions which had been in an "in-doubt" state at the time of failure. While this protocol somewhat relieves pressure from database and system providers, it is not a satisfactory solution for users who, in many cases, must somehow justify discrepancies which may have occurred between the affected database entities. In a sense, heuristic decisions are excellent, but not infallible, guesses which are sometimes applied in applications in which infallibility is highly desirable in order to permit limited access to a database having files affected by unresolved transactions.

Therefore, those skilled in the art will appreciate that it would be highly desirable to provide transaction processing features and mechanisms which cooperate to rebuild the context of transactions in the "in-doubt" state at the time of a system failure so that the protocol driver can complete the recovery protocol and direct the transaction to be either committed or rolled back as determined by the commitment coordinator. Among the functional requirements for such features and mechanisms are that they:

Allow the transaction processing protocol driver to complete recovery under the protocol and resolve "in-doubt" transactions after a system interruption.

Provide a protocol independent implementation solution for the resolution of "in-doubt" transactions after a system interruption.

Provide an administrator with the ability to locate nodes which have unresolved "in-doubt" transactions.

Provide the administrator with the ability to resolve "in-doubt" transactions manually or through heuristics at a delayed time after involved nodes have been restarted.

Prevent access to any file resources which may be required to resolve "in-doubt" transactions.

And, most directly relevant to the present invention:

Provide for recovery from multiple system interruptions during the resolution of "in-doubt" transactions which may occur at various points of a recovery; and Allow access as soon as possible to all file resources which are not required to resolve "in-doubt" transactions.

SUMMARY OF THE INVENTION

Briefly, these and other aims of the invention are achieved in data processing system participating in two-phase transaction processing operations which, when a system failure occurs while one or more transactions are in process, can successfully rebuild "in-doubt" states even when another system failure occurs during an attempt to effect the rebuild. The system includes A) a transaction processing application operating within a global transaction processing protocol incorporating a two-phase commit procedure; B) coupling means to at least one other data processing node operating within the global transaction processing protocol for information exchange therewith; C) a memory; D) a database access application communicating with the transaction processing application to address files stored in the memory and transfer data between the transaction processing application and the memory; E) a file management system having exclusive access to reserved locations in the memory for reading and writing meta-data therein; and F) physical file access logic selectively coupling the memory and the database access application, the physical file access logic incorporating file protections which are controlled by the file management system; such that, in the event of a failure at the data processing node during a transaction, the state of the transaction at the data processing node at the time of the failure can be faithfully rebuilt after restart by accessing the meta-data stored in the memory for each affected file in the memory. During recovery from a failure which occurred while a transaction was in progress, results of incomplete non-"in-doubt" transactions are removed from that affected database, and the data which was successfully updated to the "in-doubt" state before the failure are locked, thus permitting early normal access to the database files.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Modern transaction processing should be carried out with processes having certain fundamental properties: 1) atomicity, 2) consistency, 3) isolation and 4) durability.

"Atomicity" means that a transaction is an indivisible unit of work: All of its actions succeed or they all fail.

"Consistency" means that after a transaction executes, it must leave the system(s) in a correct state or it must abort. If the transaction cannot achieve a stable end state, it must return the system(s) to its (their) initial state.

"Isolation" means that a transaction's behavior is not affected by other transactions that execute concurrently. The transaction must serialize all access to shared resources and guarantee that concurrent programs will not corrupt each other's operations. A multi-user program running under transaction protection must behave exactly as it would in a single-user environment. The changes to shared resources that a transaction makes must not become visible outside the transaction until it commits.

"Durability" means that a transaction's effects are permanent after it commits. Its changes should survive system failures.

Figure 1:
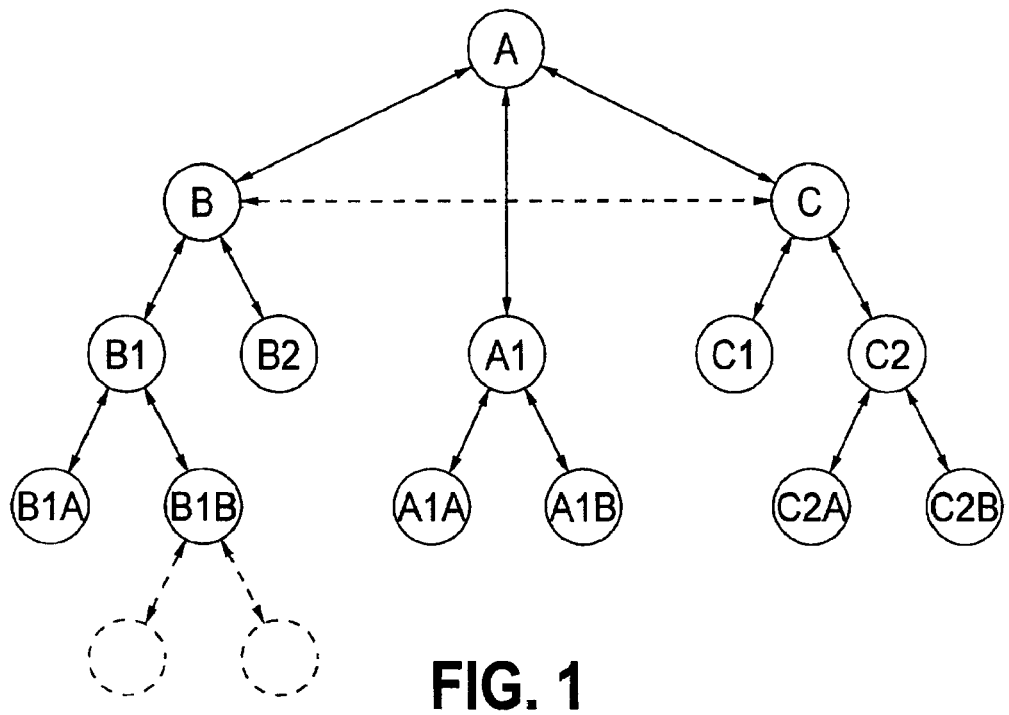
FIG. 1 is a generalized view of a plurality of data processing systems, each having intermediate and leaf subsystems, interconnected in a relationship which permits transaction processing among the participants.

Referring first to FIG. 1, transactions may occur between nodes in a single system or, as illustrated, among a plurality of systems (constituting a global transaction processing system) exemplified by systems A, B, C. Those skilled in the art will understand that the systems A, B, C may run under entirely different operating systems and may be situated remotely from one another and may even be physically situated on different continents. However, because of strict adherence to established protocols, transactions among such systems, in which files on each system are changed, may be carried out with precision.

In the example, system A institutes a transaction (is the transaction coordinator) and systems B and C are immediate subordinates for the present transaction. As indicated by the dashed line between systems B and C, either may be the transaction coordinator in a succeeding transaction. Thus, a given transaction can be deemed to constitute a transaction tree established, for the given transaction on any system interconnection configuration.

One or more or all of the systems A, B, C may have subservient nodes operating under their individual control, and these subservient (or intermediate) nodes may be superior to one or more levels of lower level subservient nodes (down the tree to leaf nodes), each operating, in turn, under the control of a superior node. Thus, system A includes intermediate node A1 and leaf nodes A1A, A1B, system B includes intermediate nodes B1 and B2, a lower level intermediate node B1B and a leaf nodes B1A with further lower level nodes which might exist as represented by the dashed elements depending from node B1B. System C includes intermediate nodes C1 and C2 with leaf nodes C2A and C2B depending from intermediate node C2. As well known in the art, the nodes subservient to systems A, B, C may be subsystems including, for example, individual nodes.

A transaction must adhere to certain requirements to be effectively performed or, if the transaction fails, to avoid rendering invalid accessed files in the one or more data processing systems involved in the transaction. Two-phase transaction processing has been developed to effectively address many transaction processing uncertainties.

Figure 2:
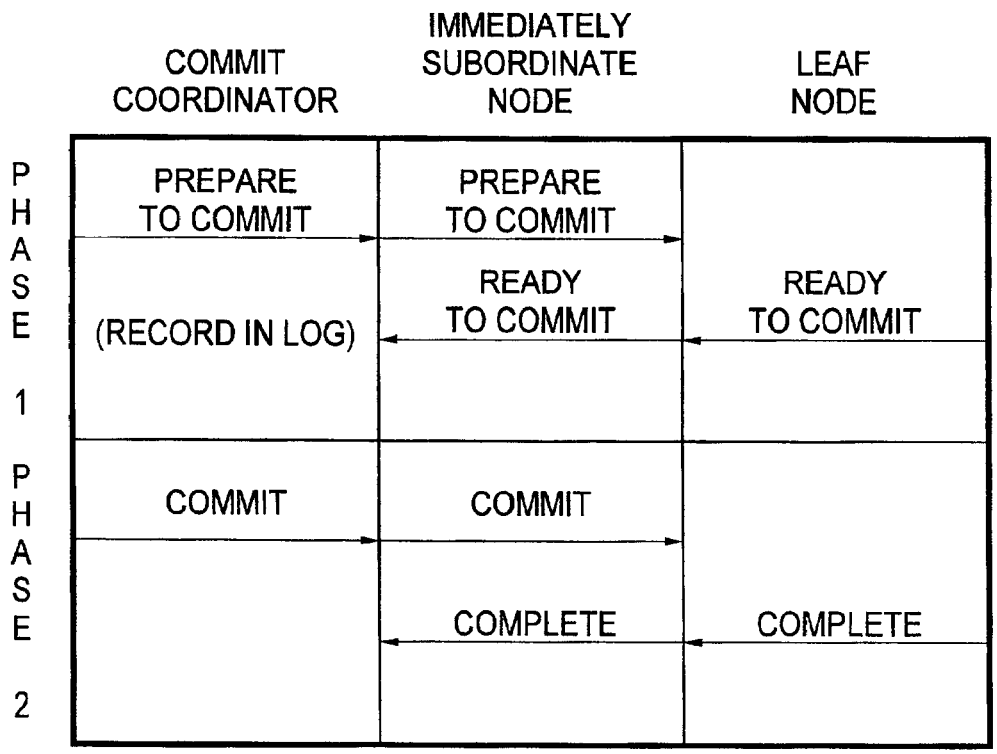
FIG. 2 is a process diagram illustrating two-phase transaction processing as widely practiced in the art.

Referring to FIG. 2 as well as FIG. 1, the well known two-phase commit protocol is used to synchronize updates on different machines so that they either all fail or all succeed. This is done by centralizing the decision to commit while giving each participant the right of veto. In order to obtain reliable interoperability, the protocol is rigidly defined.

In the first phase of a commit, the commit manager node (also known as the root node or the transaction coordinator) sends "prepare-to-commit" commands to all the immediately subordinate (in the contemplated transaction) nodes that have been directly asked to participate in the transaction. The immediate subordinates may have delegated parts of the transaction to other nodes (or resource managers) to which they must propagate the "prepare-to-commit" command. In the example, one immediate subordinate node (e.g., node C) and one leaf node (e.g., node C1) are considered.

The first phase of the commit terminates when the root node receives "ready-to-commit" signals from all its direct subordinate nodes that participate in the transaction. This means that the transaction has executed successfully so far on all the nodes, and they're now ready to do a final commit. The root node logs that fact in a safe place (this information is used to recover from a root node failure).

The second phase of the commit begins after the root node makes the decision to commit the transaction based on the unanimous "ready-to-commit" vote. It tells its subordinates to commit. They, in turn, tell their subordinates to do the same, and the order ripples down the transaction tree. The second phase of the commit terminates when all the nodes involved have safely committed their part of the transaction and made it durable. The root node receives all the confirmations and can tell its client that the transaction has completed.

The two-phase commit aborts if any of the participants return a refuse indication, meaning that their part of the transaction failed. In that case, the root node tells all its immediate subordinates to perform a rollback (i.e., return all affected files to their previous states), and they, in turn, do the same for their subordinates.

Figure 3:
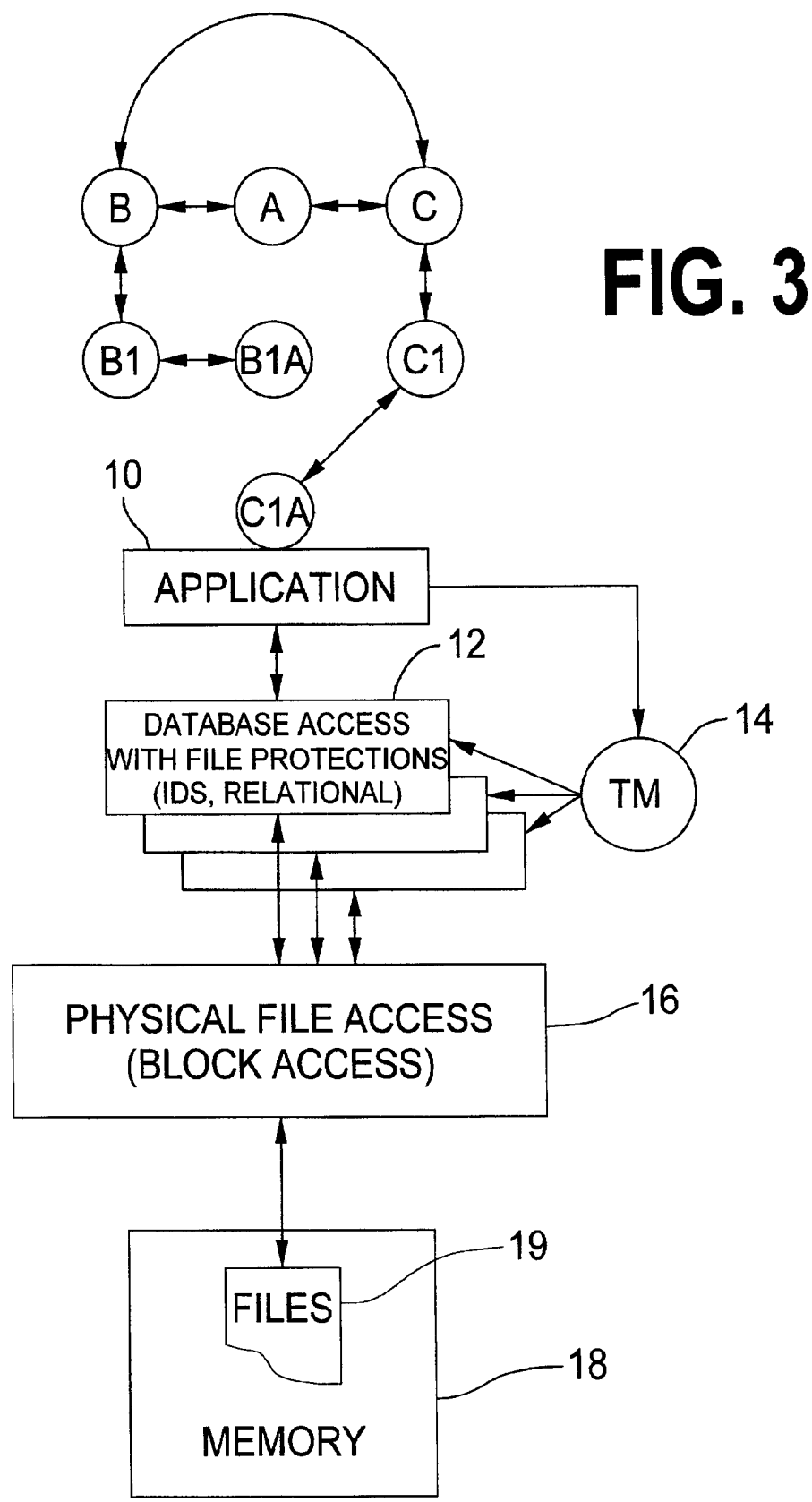
FIG. 3 is a diagram of a first file access architecture in an exemplary subsystem.
Figure 4:
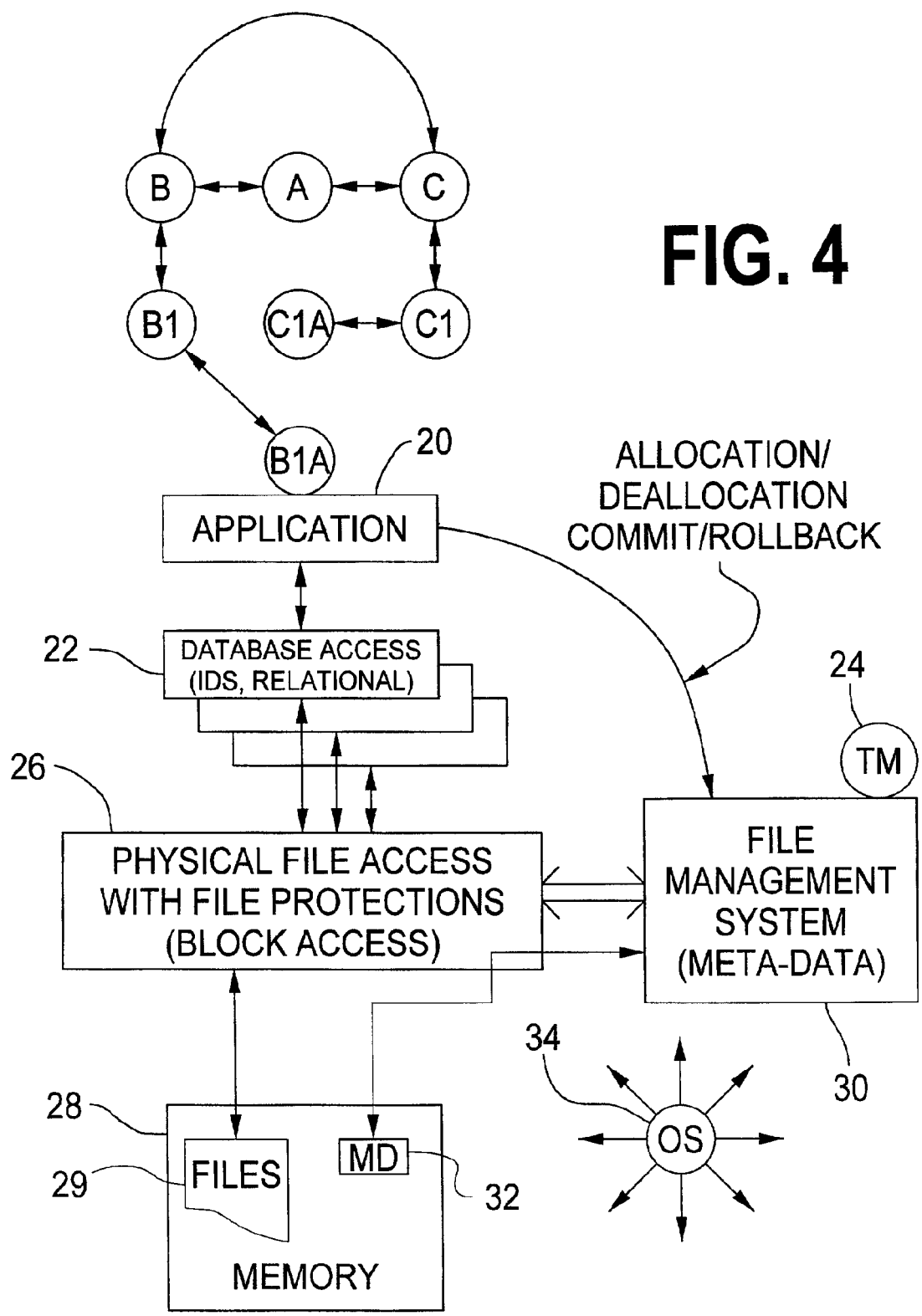
FIG. 4 is a diagram of a second file access architecture in an exemplary subsystem.
Figure 5:
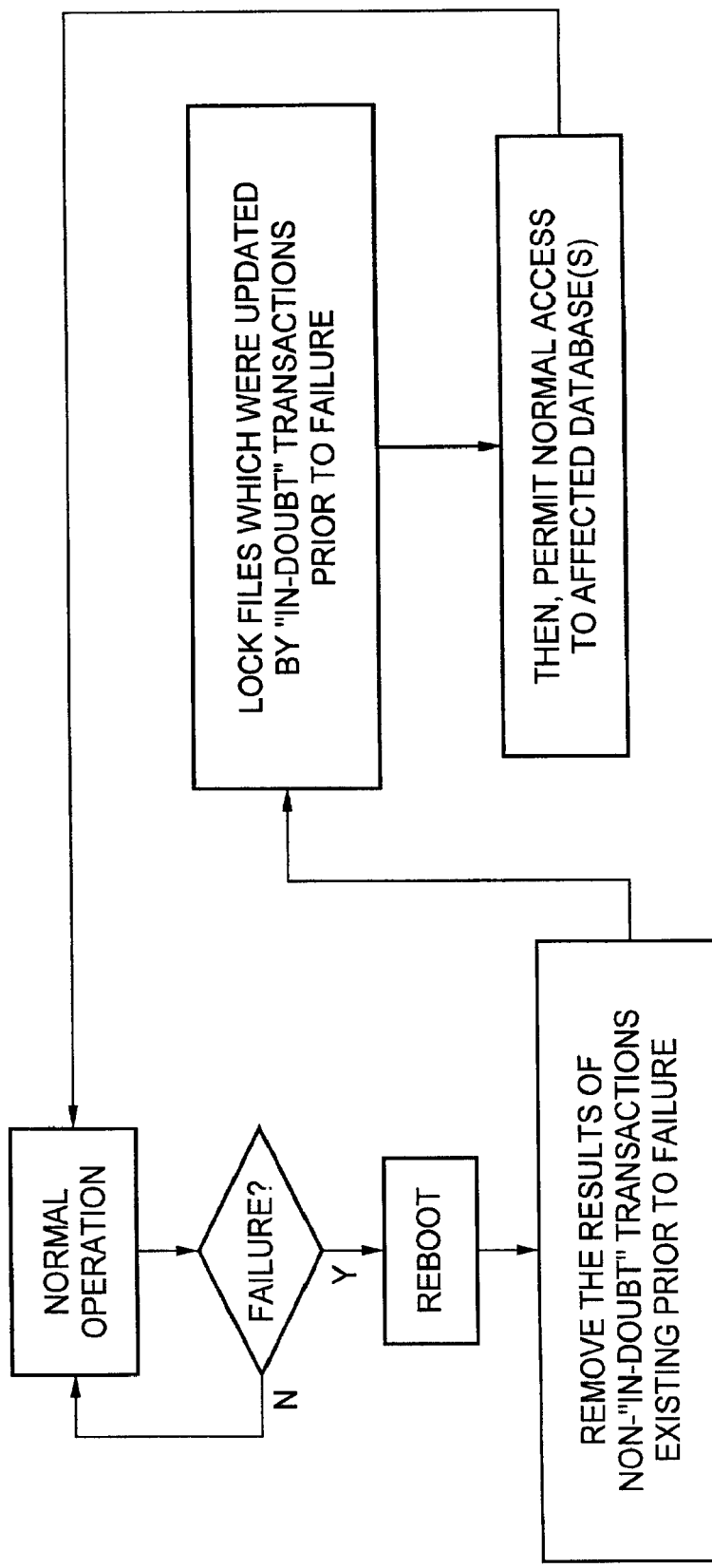
FIG. 5 is a high level flow chart of a preferred embodiment of the invention.

FIGS. 3 and 4 illustrate two different transaction processing architectures which are found in modern data processing systems and subsystems and, in the following example, are included in the global transaction processing system of FIG. 1. The transaction processing architecture employed at node C1A shown in FIG. 3 is widely used. An application 10 for carrying out the local aspects of global transactions is called when a global transaction involving node C1A is begun. The application 10, in turn, invokes a database access process 12 (which includes file protections) under control of a transaction manager 14. The database access process 12 invokes physical file access logic 16 to establish input/output communication with memory 18 having files 19 to be accessed, and changed if appropriate, as may be necessary to complete the local aspects of a global transaction. It will be particularly observed that all the file protections, including undo and redo logs, are centralized at the database access level; i.e., not enforced at the physical file access level. Also, this architecture requires that the transaction manager 14 rigidly adhere to a global transaction processing specification for transaction managers such as the X/Open XA specification.

The X/Open XA specification defines a set of interoperability standards that operate with the underlying transaction protocol. To participate in an XA-defined two-phase commit, transaction processing monitors and resource managers must map their private two-phase commit protocols to the XA commands However, in the transaction processing architecture shown in FIG. 4, the role of the database access layer 22 is reduced since the transactional behavior is enforced at the physical file access layer 26 with the cooperation of a file management system 30. File protection (transactional behavior) becomes a file attribute enforced by the file system independent of the database access layer 22 which must access the file.

Thus, referring to FIG. 4, in the transaction processing architecture employed at node B1A in the example, an application 20 for carrying out the local aspects of a new global transaction is called and, in turn, invokes a database access process 22 which does not include file protections. The database access process 22 uses, but does not control, physical file access logic 26 to carry out input/output communication with memory 28 having files 29 to be accessed, and changed if appropriate, as may be necessary to complete the local aspects of the global transaction. However, this transaction processing architecture further includes a sophisticated file management system 30 which manages physical file access logic 26 including providing file protections.

The file management system 30 has exclusive access to meta-data 32 stored in memory 28 describing the application data files also stored in memory. Accordingly, the application 20 sends allocation/deallocation and commit/rollback requests to the file management system 30 which supervises these operations by controlling the physical file access logic 26. The file protections provided by the file management system 30 include concurrent access control and the preparation and use of undo and redo log files in a recovery log for the data file blocks updated by transaction processing and stored in files 29. The undo and redo logs include data which is essential to rebuilding the state of "in-doubt" transactions.

As will become more apparent below, a system/subsystem having the file access and integrity transaction processing architecture shown in FIG. 4 can be readily adapted to incorporate the present invention whereas the transaction processing architecture shown in FIG. 3 does not have this capability.

In the architecture depicted in FIG. 4, the file management system 30 provides the enforcement of the transactional view of the database files 29. This includes the enforcement of a policy that file updates performed by uncommitted transactions may be viewed by other transactions. For a running system, this is enforced by a concurrency control function which locks data which has been read or updated by any transaction. After a system crash, the contents of the concurrency control tables, which had been maintained in host memory, are lost. The recovering node must remove the partial results of all uncommitted transactions before normal file access can be resumed. Until these partial results have been removed, the files must not be accessed by other transactions and cannot be allocated for normal use.

However, the results of transactions which had been in the "in-doubt" state at the time of the crash cannot be dealt with until the recovery phase of the two-phase commit protocol is complete. This recovery phase may take a large amount of time. Indeed, a corresponding node higher in the transaction hierarchy may have also failed. It may literally be hours before the recovery protocol completes. The task which is responsible for removing partial transaction data may not be suitable to complete the recovery protocol. These may be two separate tasks.

In order to achieve the ability to recover from system failures which can recur at a node even during an attempt to rebuild "in-doubt" states of an ongoing global transaction, the following principles and conditions must be met:

1. A commitment at one node requires an atomic operation.

2. All other nodes involved with a distributed transaction are "in-doubt" about the ultimate transaction result.

3. After a local failure at a subordinate node, the "in-doubt" state must be faithfully reconstructed.

4. Because a global transaction recovery can take an indeterminate amount of time, it is desirable to allow access to uninvolved records of a local database prior to global transaction recovery.

The special attributes of the architecture shown in FIG. 4 include:

A) separation of commit pending count in file management system meta-data from recovery data in recovery log;

B) the recovery log can be independent of or bundled with the file access method; and C) multiple local node failures can be detected and recovered by use of Boot Sequence Identifier (BSI). A BSI is incremented at each system boot and is recorded with each item of file system meta-data on persistent storage.

These attributes enable:

D) the file management system to enforce transactional rules at file allocation time for multiple access methods on the same file;

E) the distributed (e.g., XA) protocol recovery to occur later than file transaction recovery by permitting normal access to files where distributed transactions have not been resolved; and F) file partial transaction recovery (redo/undo).

Thus, still referring to FIG. 4, during crash recovery according to the present invention, files are recovered by removing results of non-"in-doubt" transactions, and locking the resources which have been updated by "in-doubt" transactions. Integrity management modules in the operating system 34 of the failing node determine the number of transactions which are in the "in-doubt" state and convey that count to node management during a subsequent node restart. Integrity management defers calling the global transaction processing protocol driver during Phase 1 recovery and will, instead, reacquire the concurrency control reservations held by the "in-doubt" transactions.

The Phase 1 recovery rebuild routines are also made available to deferred recovery procedures so that "in-doubt" transactions can be recovered in the event of Phase 1 recovery bypass or failure.

During node recovery after a failure, the node operating system 34 provides an extra process to integrity control for the recovery of each "in-doubt" transaction. Each of these processes attaches itself to a resource envelope built during Phase 1 recovery and then waits to be notified of the final dispensation of its global transaction. A heuristic time-out is employed during this period such that each of these special processes terminates as soon as its "in-doubt" state is resolved.

The file management system 30 cooperates with the operating system integrity management and global data management to keep track of file recovery until "in-doubt" states are resolved in order to provide full file access as soon as an "in-doubt" transaction is rebuilt during Phase 1 recovery. Thus, recovery from multiple system crashes can be achieved.

Preferably, administrative interfaces are included in the node's local transaction processing protocol driver in order to allow a site administrator to intervene if correspondent systems do not perform their recovery in a timely fashion.

Also preferably, the transaction processing protocol driver and integrity management allow "in-doubt" transactions to participate in global recovery protocol in the event of remote correspondent or communication failure even when there is no local node failure. Previously, "in-doubt" transactions have been resolved by heuristics during these events which has required administrators to manually resynchronize the databases of multiple machines. In one preferred embodiment of the invention, the transaction processing protocol driver invokes heuristic decisions only due to time-out or the intervention of an administrator.

Application of the invention also provides the administrator with the ability to locate nodes which have unresolved "in-doubt" transactions and to resolve "in-doubt" transactions manually or through heuristics at a delayed time after involved nodes have been restarted after a crash.

A failed correspondent machine may never recover. Therefore, the resources held by "in-doubt" transactions must be recoverable locally. Deferred recovery must provide a mechanism to force the rollback or commit, by directive, of an "in-doubt" transaction.

The recovery protocol requires that an initiator node remember "forget" messages that have arrived from all subordinate correspondents. Once a transaction takes a heuristic decision currently, the receipt of each "forget" message is noted by writing to a tenant recovery file.

A node employing two-phase commitment protocols is likely to have some arbitrary number of transactions in the "in-doubt" state at any instant. Each of these transactions is mapped to a node process until the "in-doubt" state is resolved. Accordingly, at the point of a failure, there will be an arbitrary number of transactions in the "in-doubt" state to recover. In the event of system failure, each node is recovered either during Phase 1 recovery or by a deferred recovery process.

Integrity management, which normally provides the rollback function, rebuilds an "in-doubt" state by revisiting the recovery log and requiring the updated resources held by the "in-doubt" transaction. The resource lists are managed between global data management and concurrency control modules. When the rebuild activity is complete, then concurrency control sequesters the resource list so that it can be assigned to a later recovering process. Global data management retains the "reserve" structures for each file deallocated while an activity is in the "in-doubt" state. The file system increments the in-doubt counter for each file involved in the in-doubt transaction. As stated before, this counter is qualified by the BSI of the current boot. The node's transaction processing protocol driver is not called during Phase 1 recovery nor during the normal operation of deferred recovery when "in-doubt" states are being rebuilt. Therefore, heuristics decisions will not be taken until the node is restarted.

These resource lists are held solely in memory. They represent partial transactions against the involved databases. Therefore, unrestricted access to these databases must not be allowed until these transactions are resolved. As long as all the resource lists have been rebuilt, then access will be properly controlled by concurrency control. At that time, normal file allocations can be allowed. This is accomplished by using the mechanism of "recovery done" and "recovery needed" counts in the file description records. As soon as the "recovery done" count equals the "recovery needed" count, then the relevant file is made available for normal allocation. The "in-doubt" count is retained at this time.

However, if there is a system crash, the in-memory lists will be destroyed such that the file management system must remember the existence of the lists for subsequent recovery. The file management system counts up the recoveries which complete while the recovery activity is in the "in-doubt" state. This count will be maintained in the file descriptor and counted up during file deallocation. A recovery activity (either Phase 1 or deferred recovery) normally terminating in the "in-doubt" state causes the file management system to count up "recovery done" and "in-doubt". A recovery activity abnormally terminating does not alter either count.

A subsequent deferred recovery activity allocates these files and attaches itself to the previously sequestered resource list. This deferred recovery activity will also be in an "in-doubt" state. This causes the file system to decrement the current "in-doubt" count for the file and mark the file normally busy. It is expected that the "in-doubt" count will eventually become zero.

If the system crashes while there are non-zero "in-doubt" counts, then the prior "recovery-needed" count is reinstated, and both the "recovery-done" and "in-doubt" counts are cleared.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A data processing node configured to participate in global transactions comprising:

A) a transaction processing application operating within a global transaction processing protocol incorporating a two-phase commit procedure;

B) coupling means to at least one other data processing node operating within the global transaction processing protocol for information exchange therewith;

C) a memory storing database files subject to access during transaction processing;

D) a database access application communicating with the transaction processing application to address files stored in the memory and transfer data between the transaction processing application and the memory;

E) a file management system having exclusive access to reserved locations in the memory for reading and writing meta-data therein which meta-data for each file stored in memory during transaction processing includes an undo log, and the undo log entry for each file affected by a data processing node failure is accessed after restart to provide information essential to rebuilding the state of the transaction at the data processing node at the time of the failure;

F) physical file access logic selectively coupling the memory and the database access application, the physical file access logic incorporating file protections which are controlled by the file management system;

G) node recovery means for recovering following a system failure which occurs during transaction processing on a database stored in said memory and faithfully rebuilding, after restart, the data processing node to the state immediately prior to the failure; said node recovery means including:

1) means to remove the results of incomplete non-"in-doubt" transactions;

2) means to lock files which have been updated by "in-doubt" transactions; and 3) means for permitting normal access to the database after the operations carried out by the means set forth in subparagraphs G)1) and G)2) have completed; and the data processing node being further characterized in that:

H) "recovery-needed", "recovery-done" and "in-doubt" counts are normally maintained in individual file description records and in which, in the event of a data processing node failure as evidenced by a difference between a boot sequence identifier of the current system boot and a boot sequence identifier as recorded in the file description record; and I) if the node failure occurs when there is a non-zero "in-doubt" count, then, during restart;

1) if the "recovery-needed" is non-zero, both the "recovery-done" and "in-doubt" counts are cleared; and 2) if the "recovery-needed" is zero and the "in-doubt" is non-zero, the original "recovery-needed" count is reinstated.

2. The data processing node of claim 1 in which the rebuild effected is to the "in-doubt" state.

* * * * *